(12) United States Patent
Roggendorf et al.

(10) Patent No.: US 9,892,489 B1
(45) Date of Patent: Feb. 13, 2018

(54) SYSTEM FOR AND METHOD OF PROVIDING A VIRTUAL COCKPIT, CONTROL PANEL, OR DASHBOARD USING AUGMENTED REALITY

(71) Applicants: Brian R. Roggendorf, Marion, IA (US); Stephen E. Tyson, Marion, IA (US); Steven C. Bouchett, San Diego, CA (US)

(72) Inventors: Brian R. Roggendorf, Marion, IA (US); Stephen E. Tyson, Marion, IA (US); Steven C. Bouchett, San Diego, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 178 days.

(21) Appl. No.: 13/971,695

(22) Filed: Aug. 20, 2013

(51) Int. Cl.
*G06T 3/60* (2006.01)

(52) U.S. Cl.
CPC ..................... *G06T 3/60* (2013.01)

(58) Field of Classification Search
CPC ....... G02B 2027/0181; G02B 27/017–27/0172
USPC .......................................... 345/8, 9
See application file for complete search history.

(56) References Cited

U.S. PATENT DOCUMENTS

| | | | |
|---|---|---|---|
| 2005/0234333 A1* | 10/2005 | Takemoto | G02B 27/017 600/426 |
| 2010/0026525 A1* | 2/2010 | Feyereisen | G01C 5/005 340/972 |
| 2011/0022291 A1* | 1/2011 | He | 701/120 |
| 2012/0120070 A1* | 5/2012 | Baillot | 345/419 |
| 2013/0141461 A1* | 6/2013 | Salter | G06T 7/0044 345/633 |

OTHER PUBLICATIONS

PEW, NASA's Head-Worn Display, Mar. 14, 2012, 1 page.
Vuzix, Star 1200XLD See-Through AR Eyewear System, www.vuzix.com/augmented-reality/products_star1200xld.html, retrieved on Aug. 12, 2013, 4 pages.

* cited by examiner

*Primary Examiner* — Amare Mengistu
*Assistant Examiner* — Sarvesh J Nadkarni
(74) *Attorney, Agent, or Firm* — Donna P. Suchy; Daniel M. Barbieri

(57) ABSTRACT

An apparatus provides a virtual display in an environment for various applications including avionic, naval, military, remote control, medical and other applications. The apparatus includes a camera and a processor system. The processor system for provides the virtual display using an orientation of the head sensed from a camera image. The camera image includes a marker image associated with a fixed marker disposed in the environment. The virtual display includes a virtual panel and an image panel from the camera.

20 Claims, 4 Drawing Sheets

SYSTEM FOR AND METHOD OF PROVIDING A VIRTUAL COCKPIT, CONTROL PANEL, OR DASHBOARD USING AUGMENTED REALITY

BACKGROUND

The present specification relates generally to the field of displays. More specifically, the specification relates to virtual displays.

Virtual displays can provide information that is viewable in virtual space for a user of equipment, such as robotic equipment, remote vehicles, unmanned vehicle systems (UVSs), aircraft, ships, boats, naval craft, medical equipment, training simulators, entertainment systems, military equipment, land vehicles, etc. The information can include equipment parameters, location information, video information, remote views, etc.

Virtual displays can utilize Head Mounted Displays (HMDs) (e.g., helmet mounted displays and head worn displays) to provide images to an operator or user (e.g., a pilot in a cockpit). In aircraft applications, HMDs generally include visors, combiners, optical projection elements, an image source, and a head orientation sensor. The image source provides an image which is projected to a combiner to provide a collimated image to the pilot. The image can include enhanced vision images, targeting data, flight instrument data, synthetic vision images, head up display (HUD) data, etc.

Conventional HMDs, such as those used on modern fighters, use a complex head orientation sensor to coordinate the image provided to the pilot with respect to the view within and outside the cockpit. However, complex orientation sensors are expensive, tolerance limited, bulky, require calibration, and can be inaccurate.

Video games, computers, and entertainment systems have used cameras to track body position and body movement. The body position and body movement are used to move characters in the game environment, and/or to provide hands free computing, three dimensional modeling, virtual reality, and computer aided design. In one application, Free Track software available under the GNU General Public License can be used with inexpensive off-body cameras and fixed light patterns on the head to track head movements using a four point pose estimation algorithm or a three point geometric algorithm. In another application, the Vuzix® augmented reality system uses a camera mounted on eyewear to provide an augmented reality display.

Thus, there is a need for a low cost, lightweight head orientation sensing system for virtual display. There is also a need for a head orientation sensing method which can be used with an HMD and does not require a complex orientation sensor. There is further a need for a head orientation sensor system and method that can be easily integrated in the design of a virtual display without requiring extra display space. There is further a need for a virtual display having a lower cost. There is also a need for a virtual display system and method that is optimized for use in a cockpit environment.

SUMMARY

An exemplary embodiment relates to an apparatus for providing a virtual display in an environment. The apparatus includes a camera and a processing system. The processing system provides a virtual display image using an orientation of a head sensed from a camera image. The camera image includes a marker image associated with a fixed marker disposed in the environment. The marker image is used to provide the orientation. The virtual display includes a virtual panel and an image panel from the camera.

Another exemplary embodiment relates to a method of providing a virtual display in an environment. The method includes receiving a camera image of the environment using a camera associated with a head, determining an orientation of the head based on a marker image in the camera image, and providing a virtual image to the head. The virtual image including a display panel associated with parameters of the environment sensed by equipment in the environment, wherein the virtual image does not block a view through a windshield in the environment.

Another exemplary embodiment relates to an apparatus for providing an optical display. The apparatus includes means for providing image data associated with a virtual head down display, means for determining a head orientation using at least one head-mounted camera and a fixed marker, and means for providing the virtual head down display in an appropriate virtual location in response to the head orientation.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
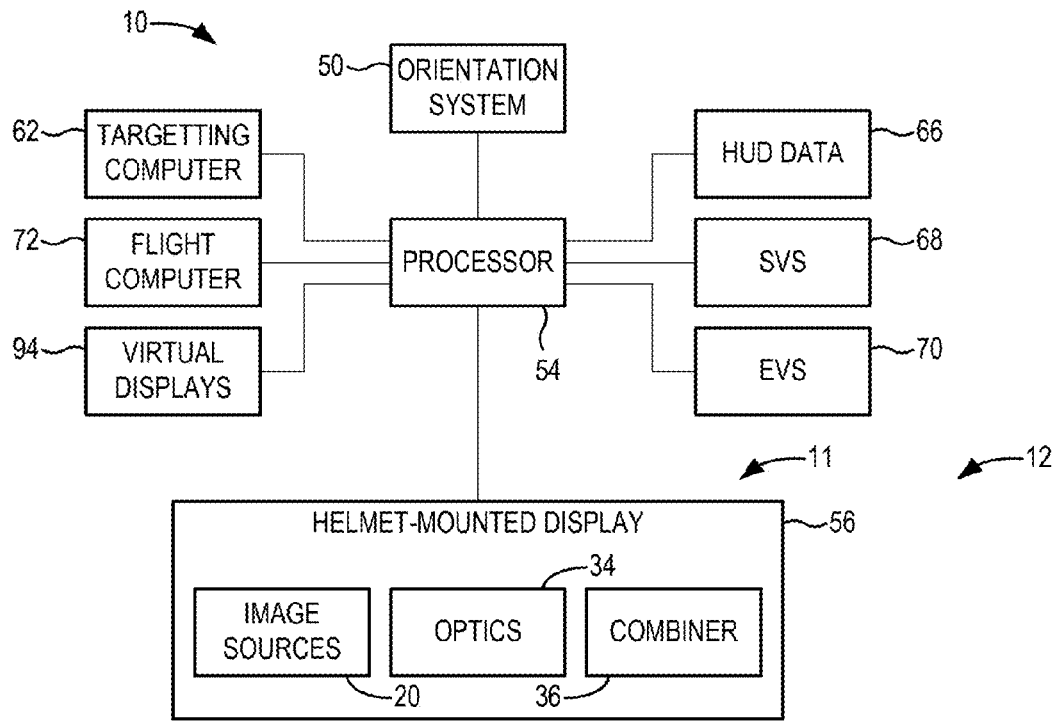
FIG. 1 is a schematic general block diagram of a virtual display system in accordance with an exemplary embodiment.

Before describing in detail the particular improved system and method, it should be observed that the invention includes, but is not limited to, a novel structural combination of components and not in the particular detailed configurations thereof. Accordingly, the structure, software, optics, methods, functions, control and arrangement of components have been illustrated in the drawings by readily understandable block representations and schematic drawings in order not to obscure the disclosure with structural details which will be readily available to those of ordinary skill in the art having the benefit of the description herein. Further, the invention is not limited to the particular embodiments depicted in the exemplary diagrams, but should be construed in accordance with the language of the claims.

With reference to FIG. 1, a virtual display system 10 provides a virtual image at one or more locations in an environment 11. System 10 can be part of a head up display (HUD) system, a helmet mounted display (HMD) system, or other worn display system. Virtual display system 10 can be utilized in various applications, including but not limited to aviation, medical, naval, targeting, ground-based vehicle, military, remote control, etc. In one embodiment, virtual display system 10 is configured for use in smaller cockpit embodiments, for use in remote vehicle or aircraft applications, for use in ships or boats, or for use in simulators or other training devices. System 10 can be utilized for two dimensional or three dimensional virtual images.

In one embodiment, virtual display system 10 is utilized in an operational system or a training system to observe and control aircraft or vehicle operation. Virtual system 10 is disposed in environment 11 which can be a cockpit, bridge, etc. Environment 11 can have a window or port to an environment 12 external to environment 11 in one embodiment. For example, environment 11 can be an aircraft cockpit, and environment 12 can be the real world viewable through the windshield of the cockpit in one embodiment.

In one embodiment, virtual display system 10 includes a processor 54, an orientation system 50, and a display unit 56. Display unit 56 can be an HMD or HUD in one embodiment. Various HMD designs can be utilized without departing from the scope of the invention. Display unit 56 can include an image source 20, optics 34 and a combiner 36. Image source 20 can provide an image to optics 34 which in combination with combiner 36 provides a collimated image for receipt by the eyes of a user, such as a pilot.

Image source 20 can be any device for providing an image including but not limited to a CRT display, an LED display, an active matrix liquid crystal display (LCD), a light emitting diode, laser illuminator, etc. In a preferred embodiment, image source 20 is a micro LCD assembly or liquid crystal on silicon (LCOS) display and can provide linearly polarized light. Image source 20 can include a laser or LED backlight.

Optics 34 can be disposed between combiner 36 and image source 20. Optics 34 can be a single optical component, such as a lens, or include multiple optical components. Optics 34 can be integrated with or spaced apart from image source 20 and/or combiner 36.

In operation, display unit 56 provides images from image source 20 to a pilot or other operator so that he or she can simultaneously view the images and a real world scene. The images can include graphic and/or text information (e.g., flight path vector, target icons, symbols, fuel indicators, course deviation indicator, pitch indicator, etc.). The virtual image data can also include information from other sensors or equipment associated with environment 10 (e.g., a vertical traffic collision avoidance display, terrain avoidance and awareness display, a weather radar display, flight control sensors, environmental sensors, etc. in an aircraft) in one embodiment. In addition, the images can include synthetic or enhanced vision images. In one embodiment, collimated light representing the image from image source 20 is provided on combiner 36 so that the pilot can view the image conformally on the real world scene through combiner 36. In one embodiment, combiner 36 is preferably a transparent substrate waveguide combiner.

Processor 54 can receive information from a variety of sources. In one embodiment, processor 54 receives information from aircraft sensors, instruments, and systems including but not limited to one or more of a targeting computer 62, a HUD computer 66, a synthetic vision system (SVS) 68, an enhanced vision system (EVS) 70, a flight computer 72, and a virtual displays system 94. In one embodiment, processor 54 can merge information from any one of systems 62, 66, 68, 70, 72 and 94 for provision to the pilot in an understandable manner. In addition, orientation system 50 can provide real world views of environment 11 and/or 12 for merging with data and/or images associated with one or more of systems 62, 66, 68, 70, 72 and 94 or with data associated with an aircraft sensor or instrument.

In one embodiment, processor 54 provides virtual display images from virtual displays system 94. Virtual displays systems 94 receives operational data (e.g., flight data,) and generates graphical virtual display image data. The operational data can include data from any of systems 62, 66, 68, 70 and 72 in one embodiment. For example, flight computer 72 and other sensors can be used to provide data for a virtual primary flight display and other virtual instruments. In one embodiment, the operational data includes vertical speed, air speed, heading, attitude, fuel level, altitude, bearing, yaw, pitch, etc. In one embodiment, system 94 accumulates such data to provide virtual vertical speed indicators, virtual altimeters, virtual pitch indicators, virtual yaw indicators, etc.)

Processor 54 and processor 268 can be combined or be stand alone circuits. Processors 54 and 268 can be a combination of hardware components and software modules configured in accordance with the operations described herein. The hardware components can include, ASICs, programmable logic, memories, computing devices, digital signal processors, video processors, general purpose processors, hardwired circuitry, and combinations thereof without departing from the scope of the invention.

Figure 2:
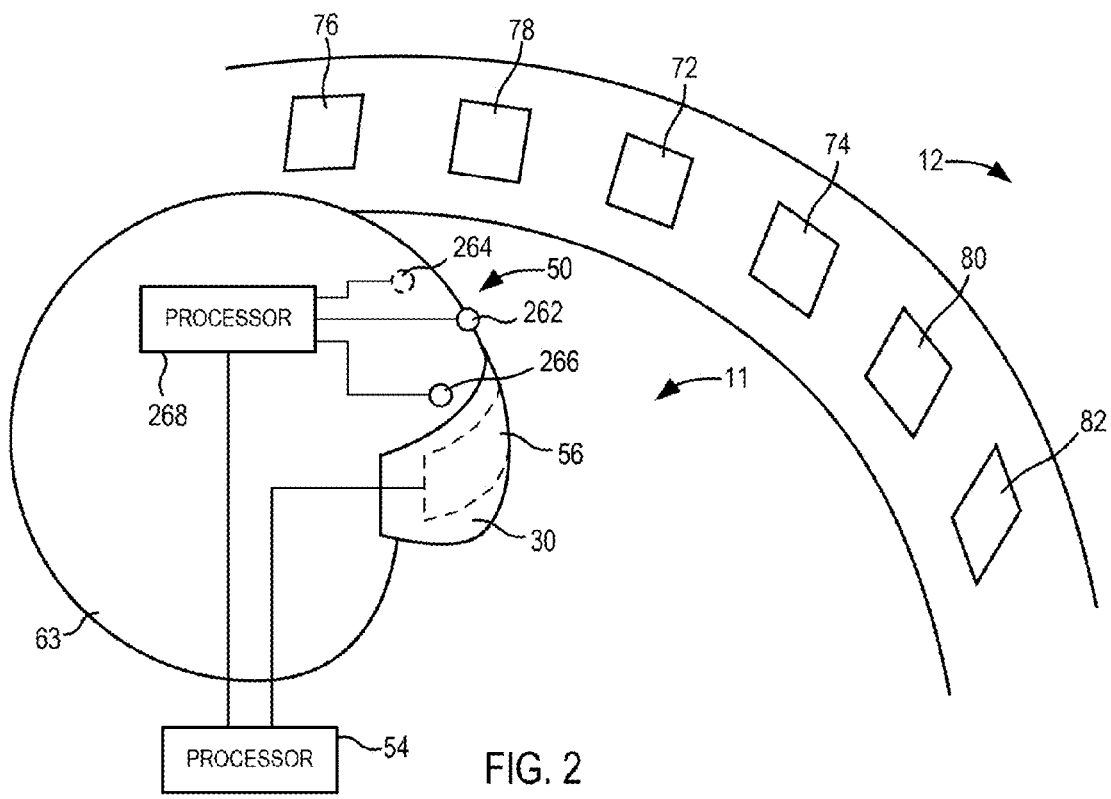
FIG. 2 is a more detailed block diagram of an orientation system for use with a helmet in the virtual display system illustrated in FIG. 1 in accordance with another exemplary embodiment.

With reference to FIG. 2, orientation system 50 can be disposed on a helmet 63 in one embodiment. System 50 includes a camera 262. In certain embodiments, system 10 can include one or more additional cameras, such as, cameras 264 and 266. Cameras 262, 264 and 266 can be any type of light sensor (e.g., a visible light camera having a monochrome or color sensor array.)

Cameras 262, 264 and 266 can be provided anywhere on a helmet 63 suitable for orientation sensing. Cameras 262, 264 and 266 are low cost, low weight camera placed around the periphery of helmet 63 in one embodiment. In one embodiment, cameras 262, 264 and 266 are arranged to have a field of view that can continually monitor orientation across the head positions of a pilot. The orientation can include X, Y and Z position, tilt and rotation.

In one embodiment, system 50 includes a processor 268 for interpreting signals or images from cameras 262, 264, 266 to provide alignment data to processor 54. The alignment data can reflect the position, tilt and rotation of helmet 63. Alternatively, processor 54 of system 10 can process images from camera 262, 264 and 266 to determine the alignment data.

Alignment data can be determined by determining the position of markers 72, 74, 76, 78, 80 and 82 in images from one or more cameras 262, 264, and 266. In one embodiment, only one camera 262 is used with one or more of markers 72, 74, 76, 78, 80 and 82. Processor 68 can utilize a pattern recognition software module to identify the fixed patterns associated with markers 72 and 74 to determine both position and orientation of the head based upon relative location and distortion of the fixed pattern as perceived by each of cameras 262, 264 and 266. Distance of the head from one of markers 72, 74, 76, 78, 80, and 82 can be approximated by the size the fixed pattern associated therewith in the image captured by one of cameras 262, 264, and 266. Horizontal and vertical skew can be used to determine elevation and azimuth of the head with respect the fixed pattern in the image captured by one of cameras 262, 264, and 266. Rotation of the head can be determined by the amount of rotation of the fixed pattern captured by one of the cameras 262, 264, and 266. Known algorithms for the above mentioned operations can be configured for system 10 and can be executed on processor 268 or processor 54.

Figure 5:
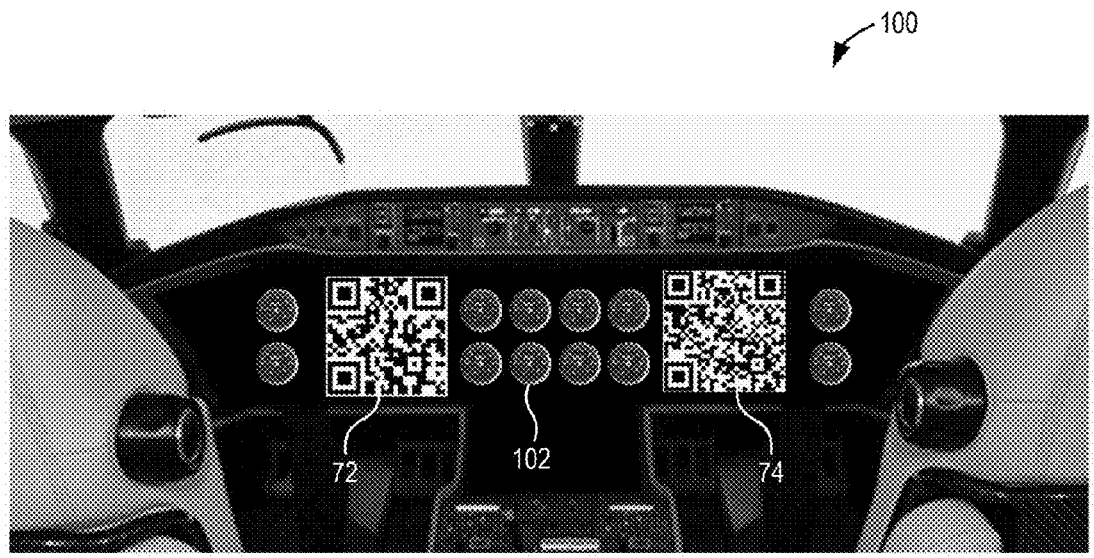
FIG. 5 is a schematic illustration of a view of the environment for the virtual display system illustrated in FIG. 1 without the use of the virtual display system.

Registration processing of images associated with markers and the known positions of the markers can be used to determine alignment data. Markers 72, 74, 76, 78, 80 and 82 can be fixed in environment 11 in one embodiment. Markers 72, 74, 76, 78, 80 and 82 can be disposed linearly, in an arc, or other position in environment 11. In addition, markers 72, 74, 76, 78, 80 and 82 can include information associated with the vehicle identification (i.e., tail number or other equipment identifier) or can provide an indication of relative position of respective marker 72, 74, 76, 78, 80 and 82 in environment 11. Markers 72, 74, 76, 78, 80 and 82 can include a printed or embossed pattern. The patterns of markers 72 and 74 are exemplary only. The QR representation of markers 72 and 74 shown in FIG. 5 are exemplary only and do not represent specific messages for this application. Various QR patterns and information can be utilized without departing from the scope of the invention.

In one embodiment cameras 262, 264 and 266 can be utilized to identify fixed patterns outside of environment 11 of the cockpit (e.g., in environment 12). In one embodiment, cameras 262, 264 and 266 can be utilized to determine vehicle orientation along the taxiway or vehicle orientation based on patterns in environment 12. In one embodiment, the patterns are marked or painted on runways and taxiways. In another embodiment, the patterns are provided on signage in environment 12. When one of cameras 262, 264, or 266 views and recognizes the patterns in environment 12, the patterns are decoded to determine location or other information for the pilot in one embodiment. Such information can be utilized to provide a "you are here" map on display unit 56. In addition, taxiway signals can be modified dynamically to include ground control instructions which could be received by camera 262, 264 and 266 and provided to pilot via system 10. The taxiway signals couple be provided on electronically controlled displays or signs in environment 12. Such instructions could include a hold short instruction, clear for take off instruction, etc which is provided to the pilot on combiner 36 (FIG. 1).

Figure 3:
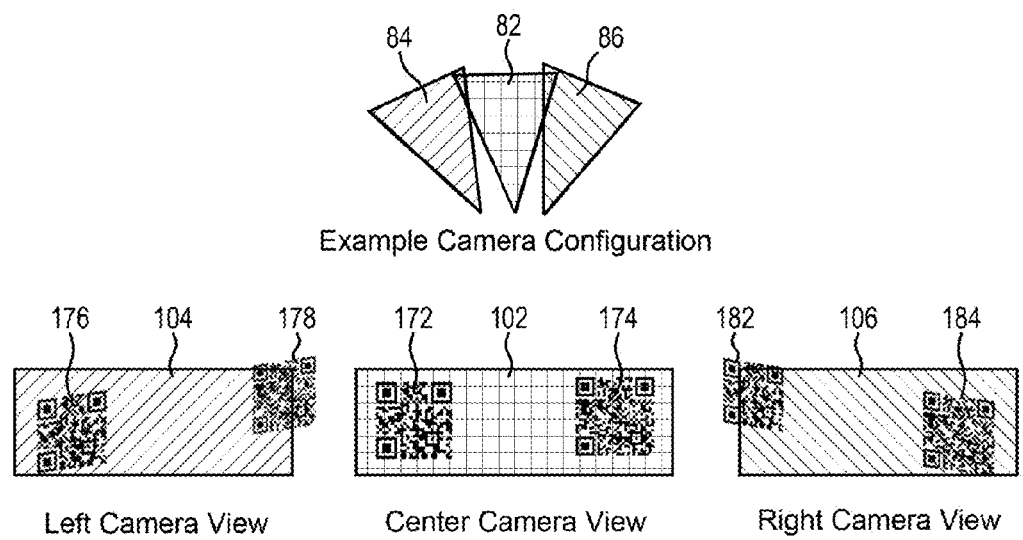
FIG. 3 is a schematic illustration of camera views for the alignment system illustrated in FIG. 2 in accordance with another exemplary embodiment.

With reference to FIG. 3, a camera view 102 is associated with camera 262 in one embodiment. A camera view 106 is associated with camera 266, and a camera view 104 is associated with camera 264. In one embodiment, camera views 102, 104 and 106 have respective conical reception areas 82, 84 and 86. Marker images 176, 178, 172, 174, 182 and 184 are associated with marker 76, 78, 72, 74, 82 and 84. In one embodiment, images 172, and 178 are associated with marker 72, images 174 and 182 are associated with marker 74, image 184 is associated with marker 80, and image 176 is associated with marker 78. As discussed above, the QR representation of images 172, 174 and 176, 182, and 184 do not represent a specific message for this application and are exemplary only.

Markers 76, 78, 72, 74, 82 and 84 contain information which identifies each marker in one embodiment. System 10 stores the real world location of each of markers 76, 78, 72, 74, 82 and 84 in one embodiment. In one embodiment, views 84 and 82 slightly overlap and views 82 and 86 slightly overlap. A comparison of marker images 178 and 172 in respective views 84 and 82, and a comparison of marker images 174 and 182 in respective views 82 and 86 can serve to determine orientation of helmet 39. The orientation shown in FIG. 3 shows that the pilot's head is facing forward with no tilt or rotation in one embodiment.

Figure 4:
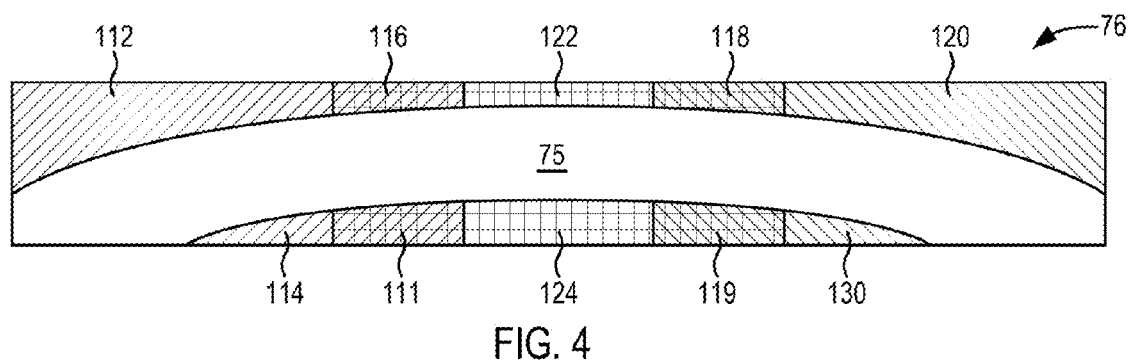
FIG. 4 is a schematic illustration of a fused panoramic virtual view for the virtual display system illustrated in FIG. 1 in accordance with another exemplary embodiment.

With reference to FIG. 4, system 10 provides a fused panoramic view 76 including a virtual display 75. In addition, an area 112 and 114 can be provided by camera 264. Area 122 and 124 can be provided by camera 262, and areas 120 and 130 can be provided by camera 264 in one embodiment. Areas 116 and 117 can be provided by either camera 264 and 262 or a merged version of images from cameras 262 and 264, and areas 118 and 119 can be provided by either cameras 262 and 264 or a merged image from camera 262 and 264 in one embodiment.

Advantageously, virtual display 75 provides a panel for providing a virtual head down display. Virtual display 75 can include a primary flight display and include images such as enhanced vision images or synthetic vision images. Further, information associated with targeting, weather, or other important information for operation can be provided in display 75. Advantageously, panoramic image 76 does not block a view of external environment 12 through a windshield and also does not block mechanical or other instruments that are desirable to be real world viewable to the pilot. For example, panoramic image 76 does not block a view of non-virtual displays, equipment, or instruments.

In another embodiment, panoramic image 76 covers the entire field of view of the operator. In such an embodiment, system 10 can provide a fully immersive virtual environment with no transparent sections. Sections that must be viewed in the real world can be provided by cameras 262, 264 and 266 and fused into the virtual image In one embodiment, panoramic image 76 covers the entire field of view of the operator with real world instruments viewable via images from cameras 262, 264, and 266 and HUD symbology provided in the real world view. Alternatively, image 76 can include transparent sections for viewing real world instruments and equipment, Back-up or redundant instruments can be provided in the area of virtual image 75 for use if system 10 malfunctions or is turned off.

With reference to FIG. 5, an environment 11 (FIG. 1) embodied as a cockpit 100 includes marker 72 and 74 and does not require a head down display because system 10 can provide a virtual head down display as described with respect to virtual display 75 in one embodiment. Cockpit 100 includes flight controls 121 and instruments 119 which are outside of panoramic view 76 in one embodiment. Instruments 102 can be behind virtual display 75 of panoramic view 76 in one embodiment.

Figure 6:
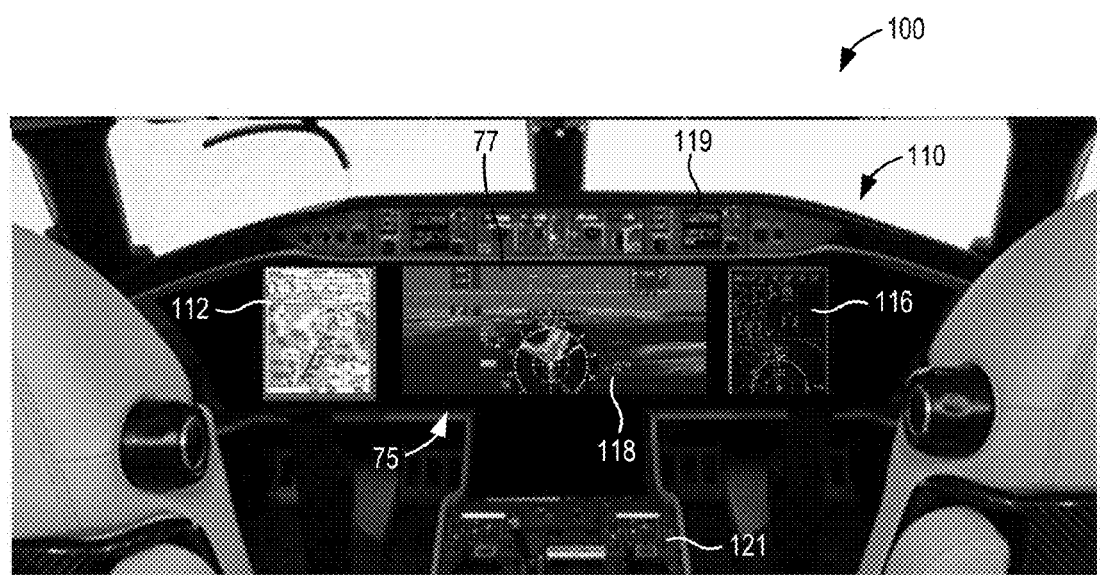
FIG. 6 is a schematic illustration of a view of the environment for the virtual display system 10 including a fused panoramic virtual image provided by the virtual display system illustrated in FIG. 1.

With reference to FIG. 6, virtual display 75 includes a virtual panel 77 that is provided in a location associated with marker 72 and 74, thereby saving display space and allowing other portions of cockpit 100 to house instruments viewable in the real world. Locating markers 72 and 74 at the location of virtual display 75 also makes the calculation of the relative location of the virtual heads down display simplified in one embodiment. Virtual panel 77 is provided so that it does not block view of controls 121 and instruments 119 in the aircraft and windshield 110 in one embodiment.

In one embodiment, panel 77 can be embodied as a rectangular area including a virtual primary flight display 118, including TCAS and SVS or EVS image, a flight plan panel 112, and a communication panel 116. Alternative panels can be provided depending on design criteria and application parameters. Other displays can be virtually provided in panel 77 and can be dynamically oriented to appear at a fixed location on the aircraft structure. Panel 77 can include virtual circuit breakers and radio interfaces as well as other instruments.

Transparent portions outside of panoramic image 76 or within virtual display 75 are modified as the head moves to ensure that the equipment and displays associated with the transparent portions can be viewed. In one embodiment, portions of virtual display 75 can be transparent allowing vision of certain instruments 102.

Figure 7:
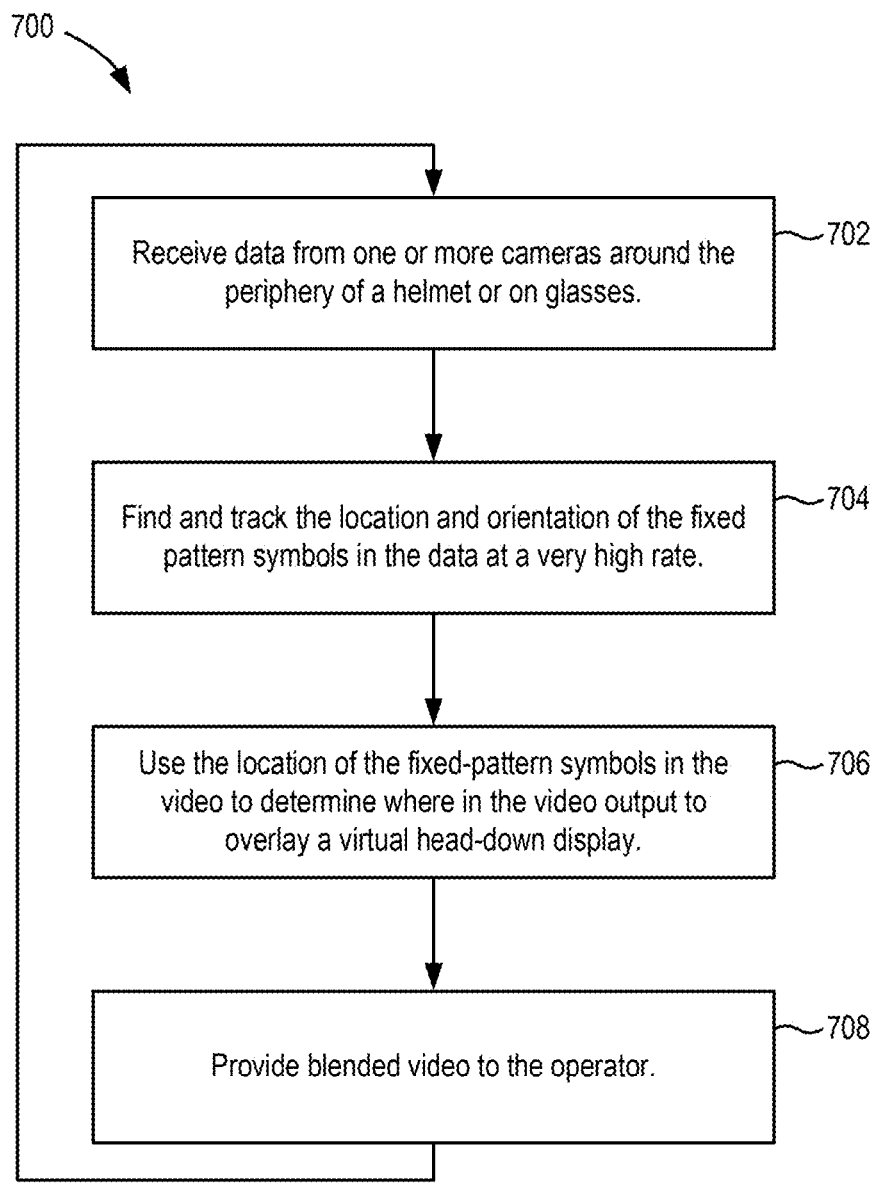
FIG. 7 is a flow diagram showing a method for the virtual display system illustrated in FIG. 1 in accordance with an exemplary embodiment.

With reference to FIG. 7, system 10 can operate according to a method 700. At a step 702, system 10 receives image data from one or more cameras 262, 264 and 266 on helmet 63. Alternatively, helmet 63 can be other worn material such as a headband, hat, glasses, etc. The images include images of fixed markers associated with marker 72 and 74.

At a step 704, processor 68 locates and tracks the location and orientation of the images continuously monitors image data from cameras 262, 264 and 266. In one embodiment, tracking occurs at a very high rate and can be provided by commercially available tracking algorithms configured for use in system 10. In one embodiment, the tracking algorithm uses a location of the pattern in a prior image frame to more quickly determine the location of the pattern at its new location.

At a step 706, processor 68 uses the location of the images to determine where to overlay a virtual head down display such as virtual display 76. At a step 708, blended video including virtual display 75 is provided to the pilot via display unit 56. The blended video can include a complete picture to the pilot that includes camera images mixed with computer-generated pixel or HUD-like approaches derived from data from systems 62, 66, 68, 70, 72, 80 and 94. Screen generated pixels can be made non-opaque allowing transparency for viewing systems outside of the virtual display 75. After step 708, method 700 returns to step 702.

In one embodiment, system 10 is utilized in an optionally piloted vehicle. Rather than burdening the vehicle with the weight and power consumption of head down displays, the vehicle would only require minimal displays (e.g., altimeter, air speedometer, etc. in an aircraft as required by the FAA) because the virtual display 75 of system 10 would replace head down displays.

While the detailed drawings, specific examples, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the communications devices. For example, the type of system components and their interconnections may differ. The systems and methods depicted and described are not limited to the precise details and conditions disclosed. The figures show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus for providing a virtual display in an environment, the apparatus comprising:

a camera; and a processor configured to provide a virtual display image using an orientation of a head sensed from a camera image, the camera image including a first marker image and a second marker image, the first marker image associated with a fixed first marker disposed at a first known position in the environment and the second marker image associated with a fixed second marker disposed at a second known position in the environment, wherein at least one flight instrument is disposed in the environment between the first known position and the second known position, wherein the first marker image includes a unique pattern indicating a relative position of the first marker image in the environment with respect to the camera, the processor providing the virtual display image based on the orientation, the orientation based on the relative position of the first marker image and the first and second known positions of the fixed first and second markers, wherein the virtual display image comprises a virtual panel, an image panel from the camera, and an image from a synthetic vision system or from an enhanced vision system.

2. The apparatus of claim 1, wherein the virtual display image is provided at a virtual location associated with a physical location of the fixed first marker and the fixed second marker, and wherein the virtual display image extends from at least the first marker to the second marker.

3. The apparatus of claim 1, further comprising: a combiner, the combiner receiving the virtual display image and providing the virtual display image to eyes of a user.

4. The apparatus of claim 3, wherein the user can see a real world scene above the virtual panel.

5. The apparatus of claim 4, wherein the camera captures a pattern along a taxiway and the processor provides a visual indication to a pilot corresponding to the pattern along the taxiway, the visual indication comprising information related to an orientation of a vehicle along the taxiway and information related to a location of the vehicle along the taxiway.

6. The apparatus of claim 1, wherein the camera is one of two or more cameras.

7. The apparatus of claim 1, wherein the fixed first marker is disposed in a first environment comprising a cockpit, and wherein the fixed second marker is disposed in a second environment external to the cockpit.

8. The apparatus of claim 1, wherein the fixed first marker and the fixed second marker each include a unique QR code.

9. The apparatus of claim 7, wherein the processor is configured to display the virtual panel to have a height equal to a physical height of the QR codes associated with the fixed first marker and the fixed second marker.

10. The apparatus of claim 1, wherein the environment comprises a cockpit, wherein the virtual panel covers a location of at least one non-virtual gauge in the cockpit, wherein the virtual display image covers a structural feature of the cockpit, and wherein the virtual display image comprises a panoramic image comprising the virtual panel and a view of an external environment external to the cockpit.

11. The apparatus of claim 10, wherein the virtual panel includes a primary flight display.

12. The apparatus of claim 1, wherein the apparatus is provided in a head mounted display, or eyewear.

13. The apparatus of claim 1, wherein at least a portion of at least one of the virtual panel and the image panel from the camera displays images provided by a physical primary flight display in a cockpit.

14. A method of providing a virtual display in an environment, the method comprising:
- receiving a camera image of the environment using a camera associated with a head, the camera image including a first marker disposed at a first known position in the environment and a second marker disposed at a second known position in the environment, wherein at least one flight instrument is disposed in the environment between the first known position and the second known position;
- reading data from a pattern within the first marker indicating a relative position of the first marker with respect to the head;
- determining an orientation of the head based on the relative position of the first marker with respect to the head; and
- providing a virtual image to the head in response to the orientation of the head and based on the known positions of the first and second markers, the virtual image including a display panel associated with parameters of the environment sensed by equipment in the environment, wherein the virtual image does not block a view through a windshield in the environment, wherein the virtual image is a primary flight display image.

15. The method of claim 14, wherein the virtual image includes a portion of the camera image.

16. The method of claim 14, wherein the first marker and the second marker each include a unique QR code, each QR code indicating a respective location within the environment.

17. The method of claim 14, wherein the virtual image includes a synthetic vision image.

18. The method of claim 14, wherein the primary flight display image is a representation of a physical primary flight display in a cockpit.

19. An apparatus for providing an optical display, the apparatus comprising:
- means for providing image data associated with a virtual head down display, the image data comprising at least one of a synthetic vision system image and an enhanced vision system image representing a physical primary flight display in a cockpit;
- means for determining a head orientation using at least one head mounted camera, a fixed first marker disposed at a first known position in the cockpit, and a fixed second marker disposed at a second known position in the cockpit, the fixed first marker including a pattern indicating relative location information of the fixed first marker with respect to the means for providing image data and identification information of the cockpit; and
- means for providing the virtual head down display in a virtual location in response to the head orientation and based on the known positions of the first and second markers.

20. The apparatus of claim 19, wherein the means for providing the virtual head down display comprises a helmet-mounted head up display.

* * * * *